US005899556A

United States Patent [19]

Ogawa

[11] Patent Number: 5,899,556
[45] Date of Patent: May 4, 1999

[54] LIGHT BULB SOCKET MOUNTING STRUCTURE AND METHOD

[75] Inventor: Shinji Ogawa, Yokkaichi, Japan

[73] Assignee: Sumitomo Wiring Systems, Ltd., Yokkaichi, Japan

[21] Appl. No.: 08/563,529

[22] Filed: Nov. 6, 1995

[30] Foreign Application Priority Data

Nov. 22, 1994 [JP] Japan .................................... 6-312454

[51] Int. Cl.[6] ............................... B60Q 1/02; F21V 19/00

[52] U.S. Cl. ................................ 362/226; 362/61; 362/80

[58] Field of Search ................................ 362/61, 80, 226, 362/457, 269

[56] References Cited

U.S. PATENT DOCUMENTS 2,110,135 3/1938 Douglas .................................. 362/226
4,947,294 8/1990 Van Duyn et al. .
5,010,455 4/1991 Luallin et al. .

FOREIGN PATENT DOCUMENTS

B2-3-14788 4/1991 Japan .
2064747 6/1981 United Kingdom .

*Primary Examiner*—Y My Quach
*Attorney, Agent, or Firm*—Oliff & Berridge, PLC

[57] ABSTRACT

A bulb socket mounting structure inhibits a bulb socket mounted on a panel from being turned to prevent the bulb socket from unintentionally coming off the panel. The bulb socket mounting structure includes a bulb socket with a fixing flange and a locking piece extending from the fixing flange. The locking piece includes a bending portion extended tangentially off an outer cylindrical surface of the fixing flange with a hook at the end of the bending portion away from the fixing flange. The panel forms an engaging recess at a predetermined position to fixedly engage the hook of the locking piece. A relief groove has an inclined guide surface at the end abutting the engaging recess. When the bulb socket is inserted into a mounting hole formed in the panel, the hook engages the relief guide. From this position, the bulb socket rotates toward a socket locking position. The hook of the locking piece moves along the relief groove without bending the locking piece. Immediately before being engaged with the engaging recess, the hook slides up the inclined guide surface while bending the locking piece. Finally the bending locking piece is restored when the bulb socket enters the socket locking position where the hook engages the engaging recess.

12 Claims, 11 Drawing Sheets

LIGHT BULB SOCKET MOUNTING STRUCTURE AND METHOD

BACKGROUND OF THE INVENTION

The present invention relates to a light bulb socket used for a vehicle lamp, headlight, or the like, and the structure for mounting the light bulb socket on a lamp panel

DESCRIPTION OF RELATED ART

A conventional L-shaped bulb socket will be described with reference to FIGS. 15 through 19.

An L-shaped bulb socket 41 is substantially L-shaped. A first end portion of the L-shaped bulb socket 41 is a substantially cylindrical bulb engaging section 42. A second end portion is a connector engaging section 43 where a mating connector (not shown) can be connected. The bulb engaging section 42 has three locking protrusions 44 on the front part of its outer cylindrical surface at angular intervals and a fixing flange 45 on the rear part.

On the other hand, the bulb engaging section 42 inserts into a mounting hole 47 of a lamp panel 46. As shown in FIG. 17, three relief cuts 48 in the perimeter of the mounting hole 47 (hereafter a hole defining portion) extend radially outwardly from the edge of the mounting hole 47. One of the locking protrusions 44 has a rotation preventing projection 49 on its rear surface. The rotation preventing projection 49 engages an engaging groove 50 formed in the rear surface of the lamp panel 46 at a predetermined position in the hole defining portion of the lamp panel 46.

The bulb socket 41 can be fixedly mounted on the panel 46. The bulb engaging section 42 is inserted into the mounting hole 47 with the locking protrusions 44 set in the relief cuts 48. Once inserted, the bulb socket 41 is turned clockwise so that the locking protrusions 44 are hidden behind the hole defining portion. As a result, the locking protrusions 44 push the hole defining portion around the mounting hole 47 against the fixing flange 45, as shown in FIG. 19. Thus, the bulb socket 41 is fixedly mounted on the panel 46. At the same time, the rotation preventing projection 49 is engaged with the engaging groove 50 to prevent the bulb socket 41 mounted on the panel from being turned.

The rotation preventing projection 49 on the rear surface of one of the locking protrusions 44 prevents the conventional bulb socket 41 mounted on the panel from being turned. The rotation preventing projection 49 slides on the rear surface of the panel 46 as the bulb socket 41 is rotated until the rotation preventing projection 49 drops into the engaging groove 50. The rotation preventing projection 49 slides while being strongly pushed against the rear surface of the panel 46. Because the bulb socket 41 is made of resin material, the top of the projection 49 can be substantially flattened during use, i.e. sliding on the rear surface of the panel 46. Over time, the engaging portion of the rotation preventing projection 49 is removed. Therefore, sometimes the rotation preventing projection 49 does not work even when the rotation preventing projection 49 engages the engaging groove 50. This problem may be eliminated by increasing the size of the rotation preventing projection 49. However, increasing the size of the rotation prevention mechanism 49 causes another problem. That is, the sliding resistance of a larger projection increases greatly. Therefore, the rotation preventing projection 49 is limited in the amount it can be made larger. Thus, as for the conventional bulb socket, the above-described problems are unavoidable.

A mating connector 51 can be engaged with the bulb socket 41 fixedly mounted on the panel 46 with the projection in the engaging groove. The connector 51 may be pushed into the socket 41 obliquely with respect to the connector engaging section 43 as indicated by the chain lines in FIG. 19. In this case, the torque applied to the bulb socket 41 is in the opposite direction to the torque applied mounting the bulb socket 41 on the panel. As a result, the bulb socket 41 is turned counterclockwise, and the locking protrusions 44 align with the relief cuts 48. Therefore the bulb socket 41 may come off the mounting hole 47. This difficulty can also occur after the connector 51 is connected to the bulb socket because the connector 51 lead wires are pulled or the bulb socket vibrates during vehicle traveling. When such a bulb socket is installed in the vehicle trunk the same difficulty can occur when pieces of luggage or the like strike the bulb socket.

SUMMARY OF THE INVENTION

It is therefore an object of the present invention to overcome at least the problems found in the above-mentioned conventional bulb socket. It is another object of the invention to provide a bulb socket fixedly mounting structure that inhibits the rotation of a bulb socket mounted on a panel to prevent the bulb socket from coming off the panel.

These and other objects and advantages of the invention are achieved by providing a bulb socket mounting structure having a bulb socket that includes a mounting section to be inserted into a mounting hole in a lamp panel where a lamp is to be mounted. The bulb socket has a socket inserting position where the mounting section is initially inserted into the mounting hole of the lamp panel and a socket locking position where the bulb socket is locked to the lamp panel. The bulb socket moves from the socket inserting position to the socket locking position by being rotated (clockwise, for example). In the socket locking position the bulb socket is inhibited from being inadvertently removed from the lamp panel.

The locking piece allows the bulb socket to turn from the bulb inserting position to the bulb locking position while being bent. However the locking piece engages the engaging section when the bulb socket reaches the bulb locking position to stop the bulb socket rotation.

The locking piece can include a knob to forcibly bend the locking piece away from the engaging section to disengage the locking piece from the engaging section.

Further, the locking piece can include a base portion extending radially outwardly from the radially outer cylindrical surface of the mounting section and a bending portion extending from the radially outward end of the base portion tangential to the outer cylindrical surface of the mounting section.

A relief path provided in the lamp panel near the inlet of the engaging section can prevent the locking piece from being bent until immediately before the locking piece engages the engaging section.

The bulb socket mounting structure operates when the locking piece is bent to permit the rotation of the bulb socket from the socket inserting position to the socket locking position. When the bulb socket reaches the socket locking position, the locking piece is restored to an unbent condition to engage the engaging section and lock the bulb socket in place, that is, to prevent the bulb socket from being accidentally turned.

To disengage the bulb socket from the socket locking position, the locking piece can include a knob to be grasped by the operator's fingers. In other words, the operator pulls the knob away from the engaging section to forcibly disengage the locking piece from the engaging section.

Therefore, in the bulb socket mounting structure when engaged with the engaging section, the bendable locking piece positively prevents the bulb socket mounted on the panel from being accidentally turned. Therefore, even when external force is carelessly applied to the bulb socket mounted on the panel, the bulb socket is prevented from being turned and prevented from coming off the panel. Further, the locking piece is not damaged while the bulb socket is being rotated from the socket inserting position to the socket locking position because of the relief path. Because the locking piece is never damaged, the bulb socket can be repeatedly used. In other words, the bulb socket mounting structure is designed to reduce a load applied to the locking piece to improve the durability of the locking piece.

The bulb socket mounting structure allows the bulb socket to be easily removed from the lamp panel. Thus, the maintenance of the vehicle lamp, for example, to replace the light bulb remains highly efficient.

The bulb socket mounting structure locking piece extends from the mounting section of the bulb socket. However, preferably the locking portion minimally protrudes away from the lamp panel. Thus, the bulb socket is compact.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
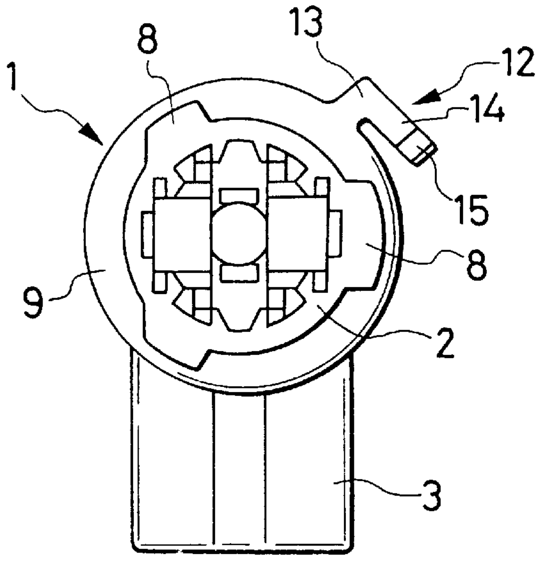
FIG. 1 is a diagram showing a front view of a bulb socket mounting structure according to one embodiment of the present invention.
Figure 3:
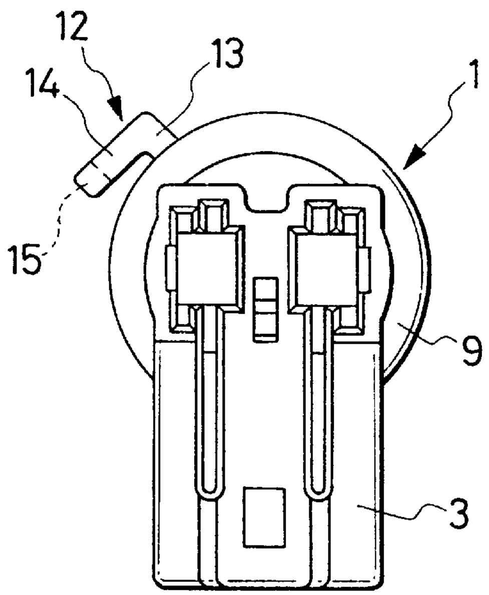
FIG. 3 is a diagram showing a rear view of the bulb socket mounting structure in FIG. 1.
Figure 2:
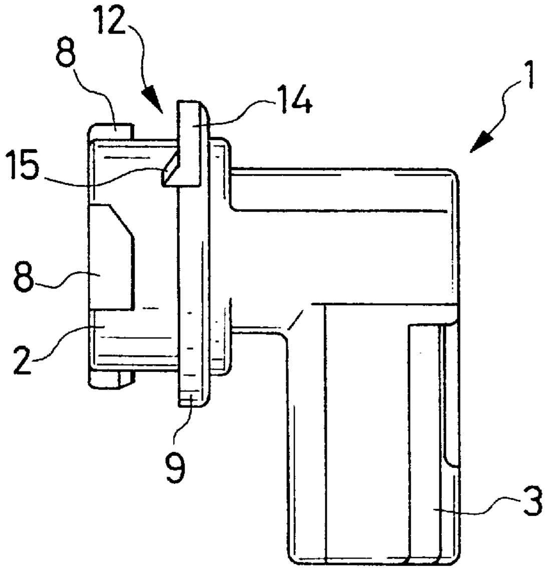
FIG. 2 is a diagram showing a side view of the bulb socket mounting structure in FIG. 1.

A first preferred embodiment of a bulb socket mounting structure according to the present invention will be described with reference to FIGS. 1–8. An L-shaped bulb socket 1 is preferably made of synthetic resin and is substantially L-shaped. As shown in FIG. 1, a first end portion of the bulb socket 1 is a substantially cylindrical bulb engaging section 2 where a light bulb (not shown) can be installed. A second end portion is a male connector section 3 where a mating female connector (not shown) can be connected. A pair of L-shaped metal terminals are fixedly set in the bulb socket 1 having opposite end portions laid in the bulb engaging section 2 and the male connector section 3, respectively.

Figure 4:
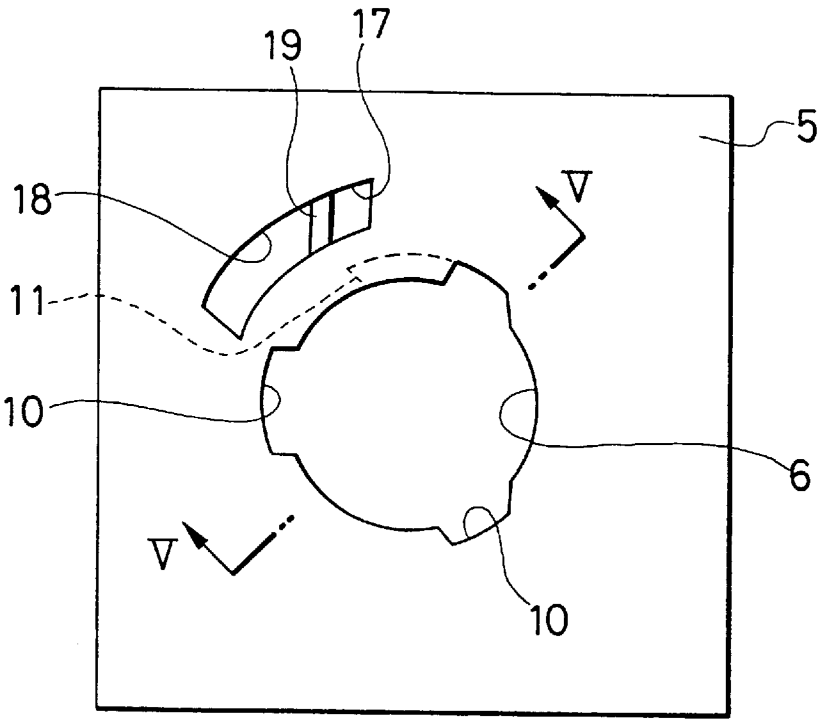
FIG. 4 is a plan view of the bulb socket mounting structure in FIG. 1 mounted on a lamp panel.

As shown in FIG. 4, the bulb socket 1 mounts on a lamp panel 5. The lamp panel 5 has a mounting hole 6 that fixedly engages the bulb engaging section 2.

The bulb engaging section 2 has three locking protrusions 8 on the front part of its outer cylindrical surface at preferably regular angular intervals and a fixing flange 9 on the rear part. On the other hands the mounting hole 6 has three relief cuts 10 in the portion of the panel defining the mounting hole 6 (hereafter a hole defining portion). The three relief cuts 10 align with the three locking protrusions 8 and allow the three locking protrusions 8 to fit behind the hole defining portion around the mounting hole 6 of the lamp panel 5.

Figure 5:
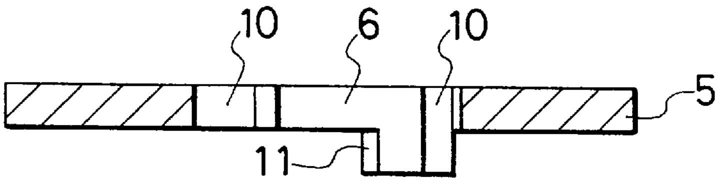
FIG. 5 is a diagram showing a sectional view taken along line V—V in FIG. 4.
Figure 7:
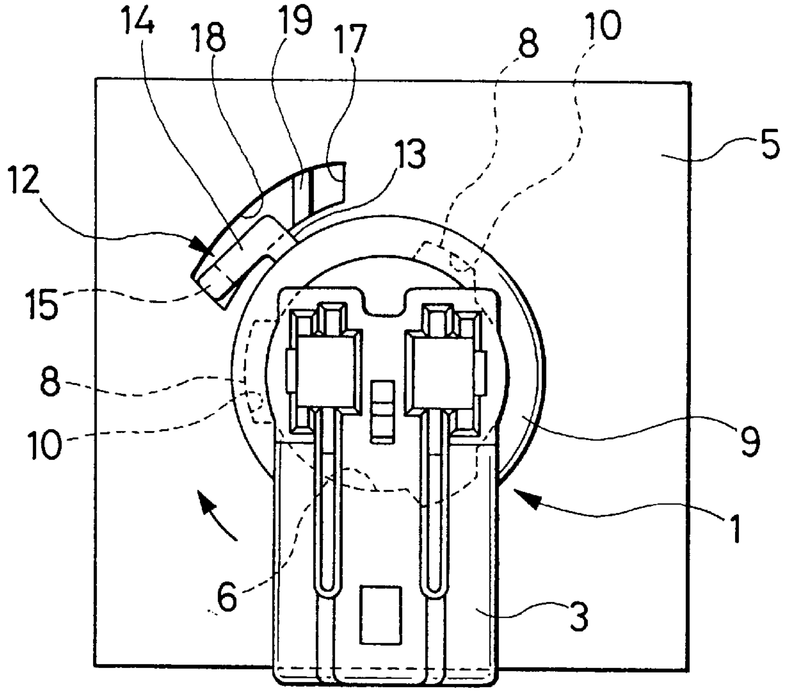
FIG. 7 is a diagram showing a plan view of the bulb socket mounting structure in FIG. 1 set at a socket inserting position.

The bulb socket 1 can be fixedly mounted on the lamp panel 5. The bulb socket 1 is initially placed into the mounting hole 6 at a socket inserting position as shown in FIG. 7. In the socket inserting position, the bulb engaging section 2 fits into the mounting hole 6 of the panel 5 with the three locking protrusions 8 set in the relief cuts 10. From the socket inserting position, the bulb socket 1 is turned preferably clockwise and the locking protrusions 8 are hidden behind the hole defining portion of the lamp panel 5. When the bulb socket 1 is turned about 45°, one of the locking protrusions 8 abuts against a stopper 11 on the rear surface of the lamp panel 5 as shown in FIGS. 5. Therefore, the rotation of the bulb socket 1 is stopped. In other words, the bulb socket 1 is at a socket locking positions When the bulb socket 1 is locked in the socket locking position, the locking protrusions 8 push the hole defining portion of the panel against the fixing flange 9 to fixedly mount the bulb socket 1 on the panel 5.

Figure 6:
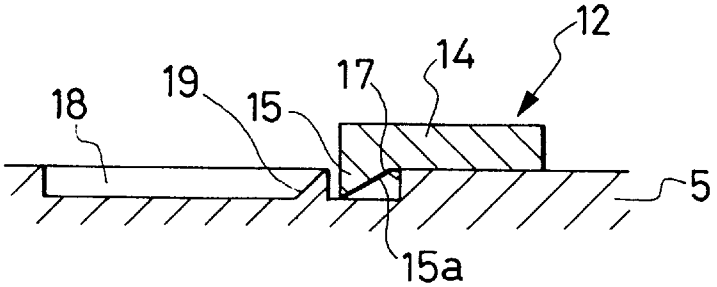
FIG. 6 is a diagram showing a sectional view taken along line VI—VI in FIG. 8.
Figure 8:
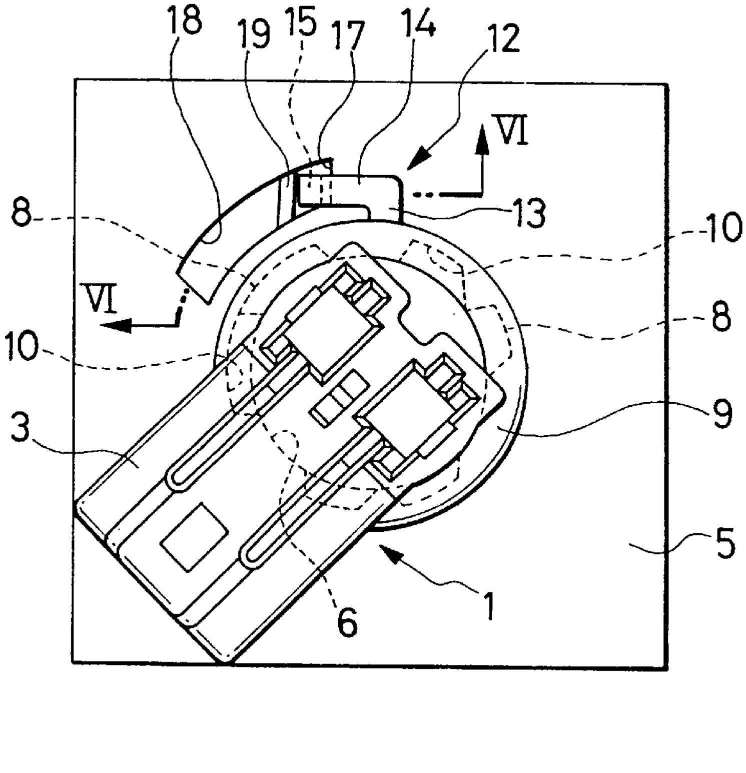
FIG. 8 is a diagram showing plan view of the bulb socket mounting structure in FIG. 1 held at a socket locking position.

A locking piece 12 protrudes from the outer cylindrical surface of the bulb engaging section 2 to prevent the bulb socket 1 from being turned counterclockwise when the bulb socket 1 is locked in the socket locking position as shown in FIG. 8. The locking piece 12 includes a relatively short base portion 13 extending radially outwardly from the fixing flange 9 and a bending portion 14 extending from the radially outward end of the base portion 13 tangential to the fixing flange 9. The bending portion 14 preferably extends tangentially counterclockwise in the first preferred embodiment, but could, for example, be designed to extend clockwise. The bending portion 14 is elastically flexible with respect to the surface of the lamp panel 5. The bending portion 14 has a hook 15 on at the end opposite the base portion 13 that extends toward and confronts the lamp panel 5. As shown in FIG. 6, the hook 15 has an inclined inner surface 15*a*.

In cooperation, an engaging recess 17 in the front surface of the lamp panel 5 engages with the hook 15 of the locking piece 12 when the bulb socket 1 is in the socket locking position. To facilitate the engagement of the hook 15 with the engaging recess 17, a relief groove 18 near the engaging recess 17 extends clockwise from the hook's 15 initial position when the bulb socket 1 is in the socket inserting position to a guide surface 19 abutting the inlet of the engaging recess 17. The relief groove 18 forms an arc according to the arcuate locus that the hook 15 describes as the bulb socket 1 rotates from the socket inserting position toward the socket locking position. The relief groove 18 is sufficiently recessed to allow the hook 15 to be contained without bending the bending portion 14 of the locking piece 12 with respect to the surface of the lamp panel 5. As shown in FIG. 6, the inclined guide surface 19 abuts the engaging recess 17 between the relief groove 18 and the engaging recess 17.

The operation of the first preferred embodiment of the bulb socket will be described.

First, the light bulb is connected to the bulb engaging section 2 of the bulb socket 1. As shown in FIG. 7, the bulb engaging section 2 is inserted in the mounting hole 6 of the panel 5 with the three locking protrusions 8 set in the corresponding relief cuts 10. When the fixing flange 9 abuts against the front surface of the panel 5, the locking protrusions 8 pass through the relief cuts 10 and go behind the panel 5 while the hook 15 of the locking piece 12 fits into the inlet of the relief groove 18 in the lamp panel 5.

Then, the bulb socket 1 is turned clockwise from the position shown in FIG. 7. As a result, the locking protrusions 8 gradually hide behind the hole defining portion of the lamp panel 5 while the hook 15 of the locking piece 12 moves along the relief groove 18 (without bending the locking piece 12) When the bulb socket 1 is turned nearly to the socket locking position, the hook 15 travels up the inclined guide surface 19 from the relief groove 18 while the bending portion 14 of the locking piece 12 is being bent. When the selected locking protrusion 8 abuts against the stopper 11, the bulb socket 1 stops at the socket locking position as shown in FIG. 8. In the socket locking position the locking protrusions 8 are fully hidden behind the hole defining portion of the lamp panel 5. In this manner, the locking protrusions 8 push the hole defining portion of the panel against the fixing flange 9 to fixedly mount the bulb socket 1 on the panel 5. Thus, the bulb socket 1 is fixedly mounted on the lamp panel 5. At the same time, the hook 15 of the locking piece 12 has travelled over the guide surface 19 to engage the engaging recess 17. When the hook 15 engages the engaging recess 17, the bending portion 14 is elastically restored. Thus, the bulb socket 1 mounted on the lamp panel 5 is prevented from being turned.

Finally, the mating female connector is connected to the male connector section 3. Using the first preferred embodiment of the bulb socket mounting structure, the female connector may form an angle with the male connector section 3 when connected to the male connector section 3. In contrast to the conventional bulb socket, no problems result from connecting a female connector that applies torque to the bulb socket 1 in the opposite direction to the torque applied to rotate and mount the bulb socket 1 on the lamp panel 5. The counterclockwise rotation of the bulb socket 1 mounted on the panel 5 is prevented by the engagement of the hook 15 with the engaging recess 17. Therefore, the bulb socket 1 is positively prevented from being returned to the socket inserting position. Thus, the bulb socket 1 is prevented from coming off the panel 5. In addition, the bulb socket 1 is prevented from being unintentionally turned even when the connected female connector lead wires are pulled, the lamp panel 5 is vibrated by the vehicle body on which it is mounted or external force is applied to the bulb socket 1, for example, by pieces of luggages.

In vehicle lamp maintenance, such as the replacement of the light bulb, the bulb socket 1 may be removed from the lamp panel 5 by using, for example, a jig. After the jig is inserted in the engaging recess 17, the jig can bend the bending portion 14 of the locking piece 12 to disengage the hook 15 from the engaging recess 17. Disengaging the hook 15 from the engaging recess 17 permits the rotation of the bulb socket 1. After rotating the bulb socket 1 counterclockwise to the socket inserting position, the bulb socket 1 can be removed from the lamp panel 5.

In the first preferred embodiment, the bendable locking piece 12 prevents the rotation of the bulb socket 1 mounted on the panel. Further, the locking piece 12 will not be damaged while the bulb socket 1 is rotated during mounting or dismounting. Thus, even if external force is carelessly applied to the mounted bulb socket 1, the bulb socket 1 is prevented from turning, and positively prevented from coming off the lamp panel 5. Further, because the locking piece 12 is not damaged during mounting, the bulb socket can be repeatedly used.

In the first preferred embodiment, the relief groove 18 receives the hook 15 of the locking piece 12 while the bulb socket 1 is being rotated. Thus, the bending force is applied to the locking piece 12 only when the hook 15 crosses the inclined guide surface 19 immediately before the hook 15 enters the engaging recess 17. Therefore, the load applied to the locking piece 12 is reduced and the service life is lengthened.

Further, the locking piece 12 does not protrude far from the fixing flange 9; rather the locking piece 12 is sufficiently bendable to engage the engaging recess 17. This makes it possible to make the bulb socket 1 compact.

Figure 9:
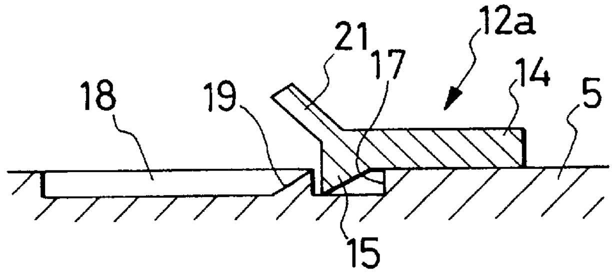
FIG. 9 is a diagram showing a fragmentary sectional view of a bulb socket mounting structure according to another embodiment of the present invention.

A second preferred embodiment of the bulb socket mounting structure according to the present invention will be described with reference to FIG. 9. The second embodiment differs from the first preferred embodiment in a locking piece 12*a*. A knob 21 extends away from the lamp panel 5 connected to the hook 15 end of the bending portion 14 of the locking piece 12*a*. The knob 21 can be held with the perator's fingers. In the first preferred embodiment, the locking piece 12 was disengaged from the engaging recess 17 when a jig or the like raised the hook 15. In the second preferred embodiment, raising the knob 21 with the fingers disengages the hook 15 from the engaging recess 17. Thus, the knob 21 is used to bend the bending portion 14 and the bulb socket 1 is easily allowed to turn. In summary, the second embodiment requires no jig to remove the bulb socket 1 from the panel. Therefore, the bulb socket 1 is easily removed from the lamp panel 5 without tools.

Figure 10:
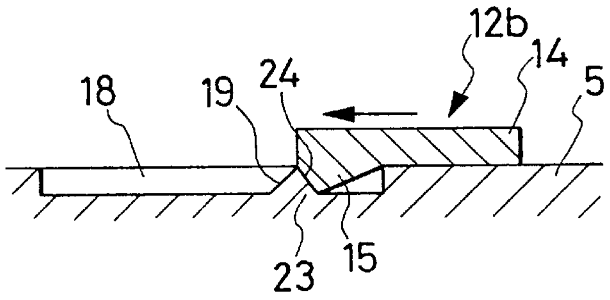
FIG. 10 is a diagram showing a fragmentary sectional view of a bulb socket mounting structure according to yet another embodiment of the present invention.
Figure 11:
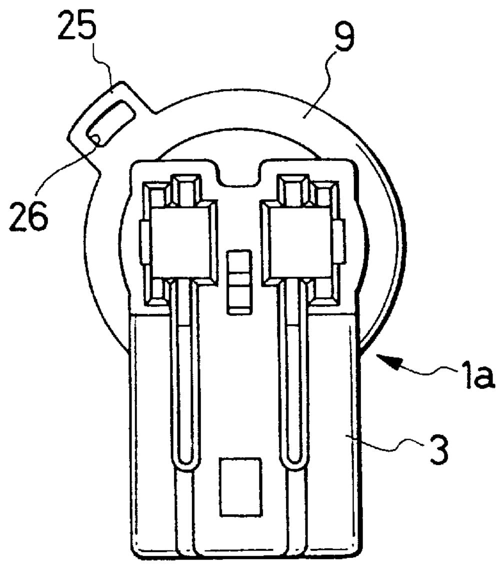
FIG. 11 is a diagram showing a rear view of a bulb socket mounting structure according to still yet another embodiment of the present invention.
Figure 20:
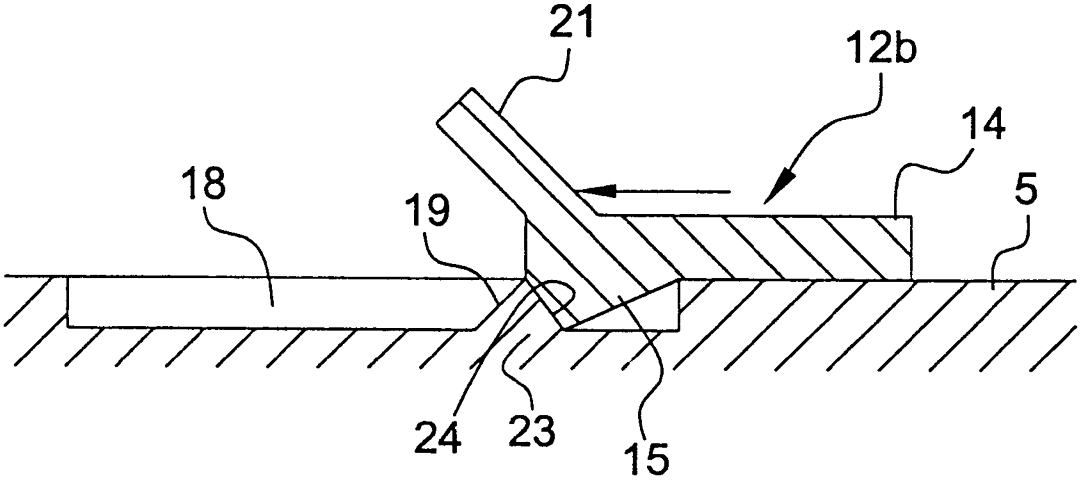
FIG. 20 is a diagram showing a fragmentary sectional view of a bulb socket mounting structure according to still yet another embodiment of the present invention.

A third preferred embodiment of the bulb socket mounting structure according to the present invention will be described with reference to FIG. 10. In the third preferred embodiment, the hook 15 of the locking piece 12*b* and the engaging recess 17 have locking surfaces 23 and 24, respectively, which are inclined and abutted against each other in the socket locking position. When the bulb socket is held at the socket locking position, a force applied to the bulb socket 1 in the direction of the arrow shown in FIG. 10 to turn the bulb socket 1 can disengage the locking surface 23 of the hook 15 from the engaging recess 17. Further, sliding the hook 15 up the locking surface 24 of the engaging recess 17 releases the locking piece 12*b*. Thus, the third preferred embodiment has the advantage that removing the bulb socket 1 is easily performed without the knob 21 or tools. However, the bulb socket 1 should be installed inside the vehicle body where no external force can be carelessly applied to the bulb socket 1. A fifth preferred embodiment of the bulb socket mounting structure according to the present invention will be described with reference to FIG. 20. In the fifth preferred embodiment, the locking piece 12*b* includes the hook 15, the knob 21 and the locking surfaces 23 and 24.

Figure 12:
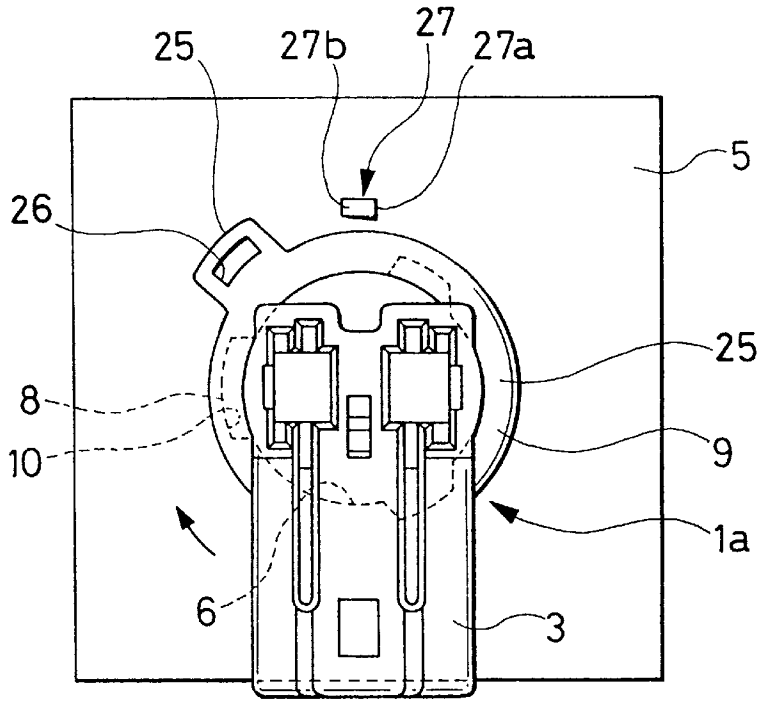
FIG. 12 is a diagram showing a plan view of the bulb socket mounting structure in FIG. 11 set at a socket inserting position.
Figure 13:
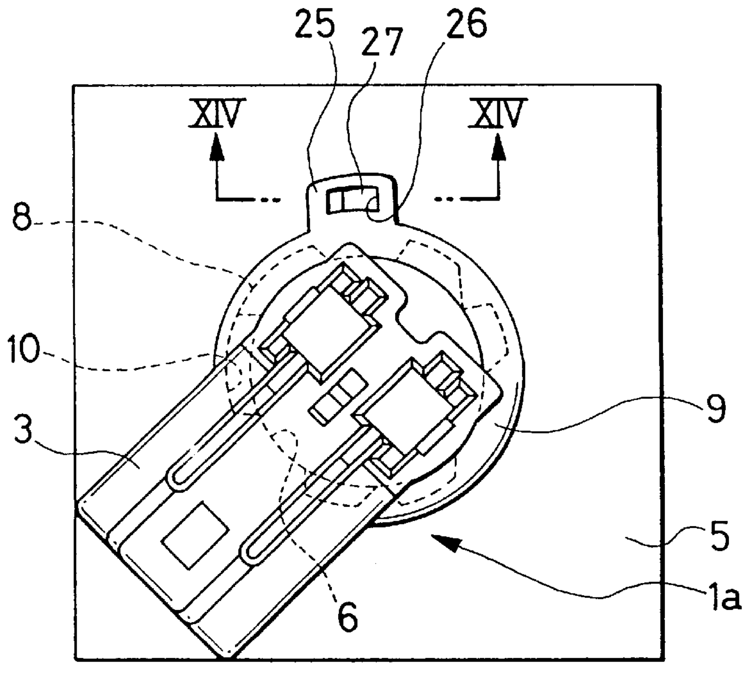
FIG. 13 is a diagram showing a plan view of the bulb socket mounting structure in FIG. 11 held at a socket locking position.
Figure 14:
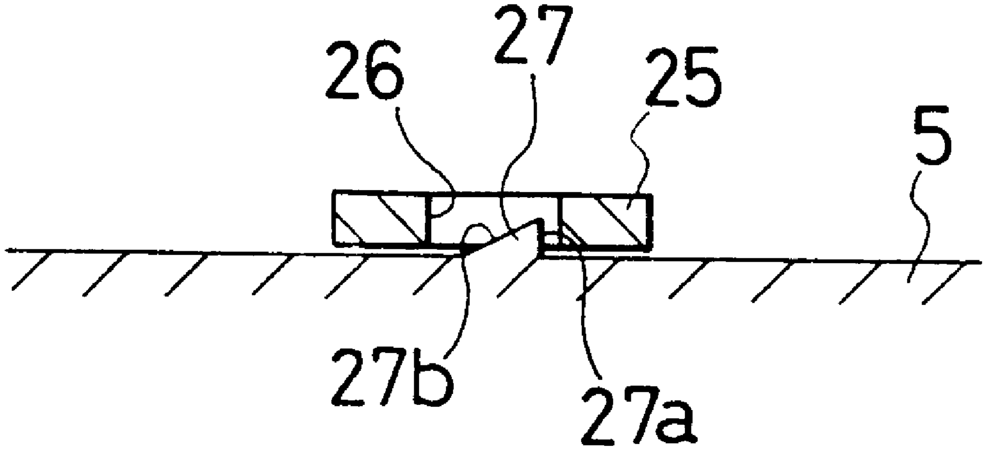
FIG. 14 is a diagram showing a sectional view taken along line XIV–XIV in FIG. 13.
Figure 15:
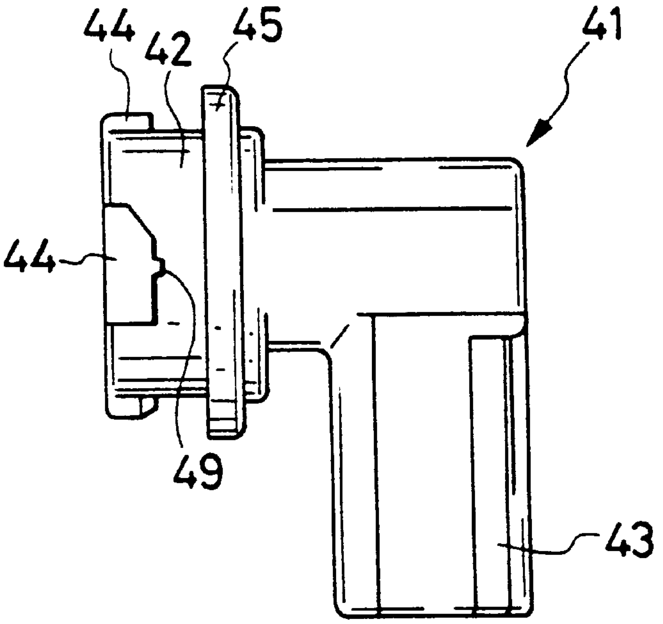
FIG. 15 (PRIOR ART)
FIG. 15 is a diagram showing a side view of a conventional bulb socket.
Figure 16:
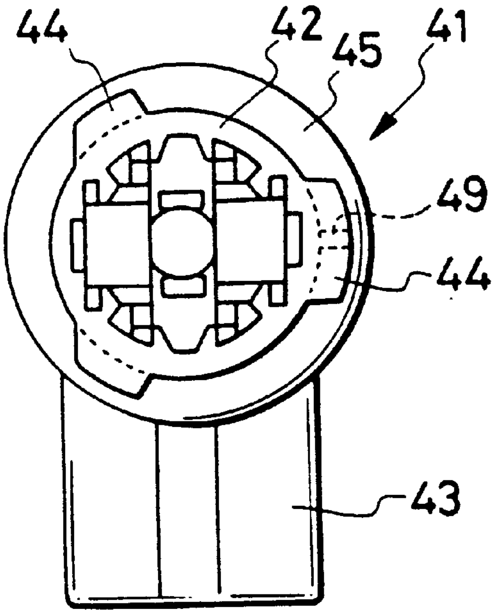
FIG. 16 (PRIOR ART)
FIG. 16 is a diagram showing a front view of the conventional light socket.
Figure 17:
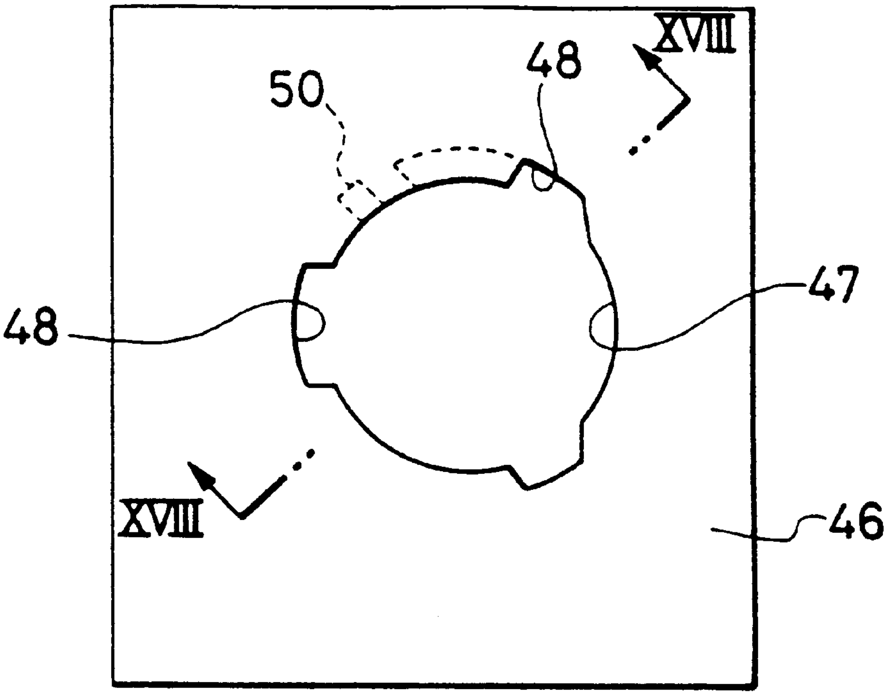
FIG. 17 (PRIOR ART)
FIG. 17 is a diagram showing a plan view of the conventional bulb socket mounted on a lamp panel.
Figure 18:
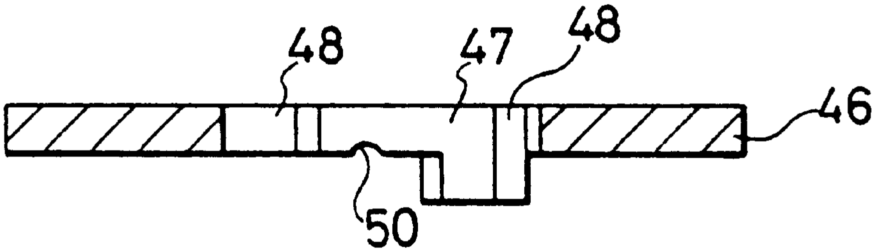
FIG. 18 (PRIOR ART)
FIG. 18 is a diagram showing a sectional view taken along line XVIII–XVIII in FIG. 17.
Figure 19:
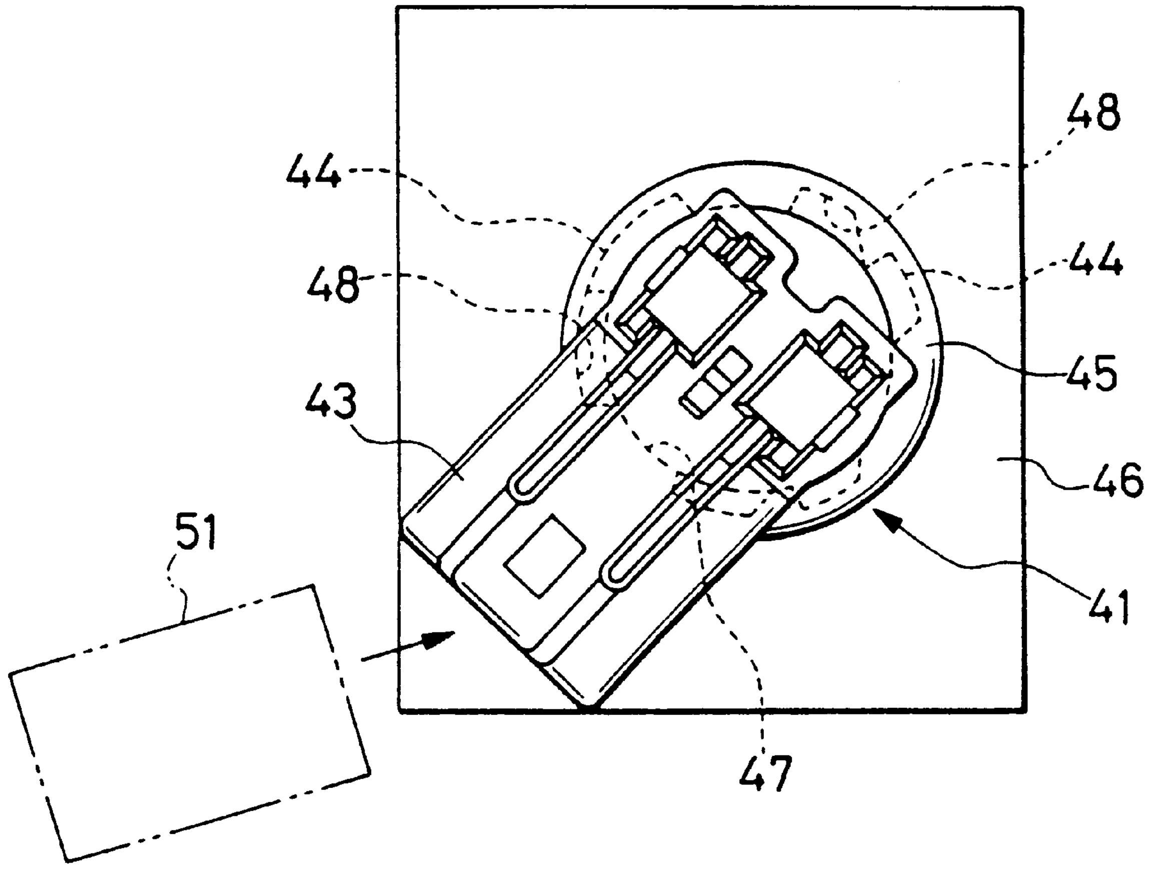
FIG. 19 (PRIOR ART)
FIG. 19 is a diagram showing a plan view of the conventional bulb socket held at a bulb locking position.

A fourth preferred embodiment of a bulb socket mounting structure according to the present invention will be described with reference to FIGS. 11–14. In the fourth preferred embodiment, a bulb socket 1*a* includes the bulb engaging section 2, the fixing flange 9 and a tongue-shaped locking piece 25 extending radially outward from the outer cylindrical surface of the fixing flange. The locking piece 25 has an engaging hole 26 in an end portion away from the fixing flange 9. As shown in FIG. 12, an engaging protrusion 27 on the front surface of the lamp panel 5 at a predetermined position on the arcuate locus of the end portion of the locking piece 25 so that the protrusion 27 can engage the engaging hole 26 of the locking piece 25. As shown in FIG. 14, the engaging protrusion 27 has a front surface 27*a* formed at a steep and almost right angle with the lamp panel 5 and an lesser inclined rear surface 27*b*.

When, as shown in FIG. 12, the bulb engaging section 2 of the bulb socket 1*a* is inserted into the mounting hole 6 of the lamp panel 5 with the locking protrusions 8 set in the relief cuts 10, the locking piece 25 is located counterclockwise of the engaging protrusion 27. As the bulb socket 1*a* is rotated clockwise, the locking piece 25 slides up the inclined surface 27*b* of the engaging protrusion 27 while being bent When, as shown in FIG. 13, the bulb socket 1*a* is turned to the socket locking position, the engaging hole 26 of the locking piece 25 encloses the engaging protrusions 27. In the socket locking position, the bendable locking piece 25 is restored to cause the engaging hole 26 to engage with the engaging protrusion 27, and the bulb socket 1*a* is prevented from turning.

Figure 21:
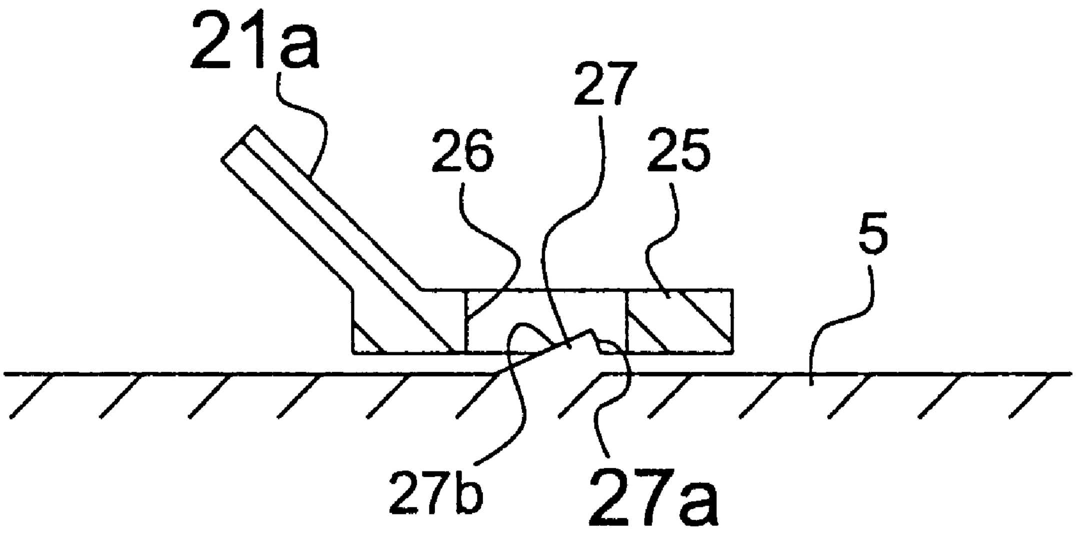
FIG. 21 is a diagram showing a fragmentary sectional view of still yet another embodiment of a bulb socket mounting structure of the present invention.

In the fourth preferred embodiment, the locking piece 25 prevents the accidental rotation of the bulb socket 1*a* by the different rotational force necessary to force the locking piece 25 over the inclined surface 27*b* and the front surface 27*a,* respectively Thus, the bulb socket 1*a* mounted on the panel is positively prevented from being turned. Further the locking piece 25 will not be damaged while the bulb socket 1*a* is being turned. Therefore, the bulb socket 1*a* can be reused. A sixth preferred embodiment of a bulb socket mounting structure is shown in FIG. 21. The sixth preferred embodiment differs from the fourth preferred embodiment in the locking piece 25 and the engaging protrusion 27. In the sixth preferred embodiment, the locking piece 25 includes a knob 21*a*. Further, the engaging protrusion 27 includes a steeply inclined surface 27*c* and the inclined surface 27*b*.

In the illustrated embodiments, the bulb socket has a bendable locking portion. However, the invention is not limited to a bendable bulb socket mounting structure with the bendable piece located on the bulb socket. In contrast, the panel can include a bendable locking piece and the bulb socket can include an engaging section to engage the locking piece.

Further, in the illustrated embodiments, the L-shaped bulb socket is a non-waterproof type. However, the invention an be applied to a waterproof type L-shaped bulb socket, which can be designed to include a seal ring fitted on the front surface of the fixing flange of the bulb engaging section and the bulb engaging section fixedly engages the mounting hole of the panel while pushing the seal ring against the front surface of the lamp panel.

Further, the invention applies not only to L-shaped bulb sockets but also to other bulb socket types that mount on a corresponding panel by being turned through a predetermined angle.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative not limiting Various changes may be made without departing from the spirit and scope of the invention as defined in the following claims.

What is claimed is:

1. A bulb socket mounting structure, comprising:
   - a lamp panel having a mounting hole;
   - a bulb socket having a mounting section where a lamp is mounted, the mounting section inserting into the mounting hole, the bulb socket moving between a socket inserting position and a socket locking position, said socket inserting position being an initial inserted position of the mounting section in the mounting hole, said socket locking position being a position where the bulb socket is fixedly mounted to the lamp panel and inhibited from being removed from the lamp panel;
   - a bendable locking piece connected to one of the lamp panel and the bulb socket; an engaging section on another one of the lamp panel and the bulb socket, the engaging section engaging with the locking piece, the locking piece bending to permit the bulb socket to rotate from the socket inserting position to the socket locking position, said locking piece engaging with the engaging section to prevent the bulb socket from rotating when the bulb socket enters the socket locking position; and
   - a relief groove provided near an inlet of the engaging section so the locking piece is prevented from being bent until immediately before engaging with the engaging section.

2. The bulb socket mounting structure according to claim 1, further comprising a knob connected to the locking piece, said knob being connected on an end of the locking piece furthest from the mounting section and extending away from said lamp panel, the knob being used to forcibly bend the locking piece and disengage the locking piece from the engaging section.

3. The bulb socket mounting structure according to claim 2, wherein the locking piece includes a hook extending from the end of the locking piece furthest from the mounting section and extending toward the lamp panel to engage with the engaging section, the hook having an inclined surface relative to a bottom surface of the engaging section.

4. The bulb socket mounting structure according to claim 1, wherein the locking piece includes a base portion extending radially out from an outer cylindrical surface of the mounting section and a bending portion connected to a radial outward end of the base section and extending tangential to the outer cylindrical surface of the mounting section.

5. The bulb socket mounting structure according to claim 4, wherein the locking piece further includes a hook extending toward the lamp panel from an unconnected end of the bending portion, the hook engaging with the engaging section, the hook having an inclined surface relative to a bottom surface of the engaging section.

6. The bulb socket mounting structure according to claim 5, wherein the hook further includes a steep surface, wherein the steep surface has a greater incline than the inclined surface relative to the bottom surface of the engaging section.

7. A bulb socket mounting structure, comprising:

a lamp panel having a mounting hole;

a bulb socket having a mounting section where a lamp is mounted, the mounting section inserting into the mounting hole, the bulb socket moving between a socket inserting position and a socket locking position, said socket inserting position being an initial inserted position of the mounting section in the mounting hole, said socket locking position being a position where the bulb socket is fixedly mounted to the lamp panel and inhibited from being removed from the lamp panel;

locking means for locking the bulb socket to the lamp panel; and engaging means for engaging with said locking means, wherein one of the mounting section of the bulb socket and the lamp panel includes the locking means, another of the mounting section of the bulb socket and the lamp panel includes the engaging means, the locking means bending to permit the bulb socket to rotate from the socket inserting position to the socket locking position, the locking means engaging with the engaging means to stop the bulb socket when the bulb socket reaches the socket locking position; and a relief groove provided near an inlet of the engaging means so the locking means is prevented from being bent until immediately before engaging the engaging means.

8. The bulb socket mounting structure according to claim 7, further comprising a knob connected to the locking means, said knob being connected on an end of the locking means furthest from the mounting section and extending away from the lamp panel, the knob being used to forcibly bend the locking means and disengage the locking means from the engaging means.

9. The bulb socket mounting structure according to claim 7, wherein the locking means includes a base portion extending radially out from an outer cylindrical surface of the mounting section and a bending portion connected to a radial outward end of the base section and extending tangential to the outer cylindrical surface of the mounting section.

10. A method for mounting a bulb socket mounting structure, comprising the steps of:

aligning angularly spaced cuts along a perimeter of a mounting hole in a lamp panel with angularly spaced protrusions from a mounting section of the bulb socket mounting structure;

inserting the mounting section into the mounting hole of the lamp panel;

placing a locking piece connected to and extending from one of the lamp panel and the bulb socket mounting structure into a corresponding initial position abutting an engaging section on another one of the lamp panel and the bulb socket mounting structure; and rotating the bulb socket mounting structure in a mounting direction with respect to the lamp panel to bend one of the locking piece and the engaging section and to engage the locking piece with the engaging section, wherein a relief groove is provided near an inlet of the engaging section so that one of the locking piece and the engaging section is prevented from being bent until immediately before engaging with another of the locking piece and engaging section.

11. The method according to claim 10, further comprising the step of rotating the bulb socket mounting structure in a direction opposite to the mounting direction with respect to the lamp panel to disengage the locking piece from the engaging section.

12. The method according to claim 10, wherein the locking piece includes a base portion extending radially out from an outer cylindrical surface of the mounting section and a bending portion connected to a radial outward end of the base section and extending tangential to the outer cylindrical surface of the mounting section.

* * * * *